H. C. ADAM.
ANTIFRICTION BEARING FOR TROLLEY WHEELS.
APPLICATION FILED JAN. 2, 1914.
1,136,200.
Patented Apr. 20, 1915.
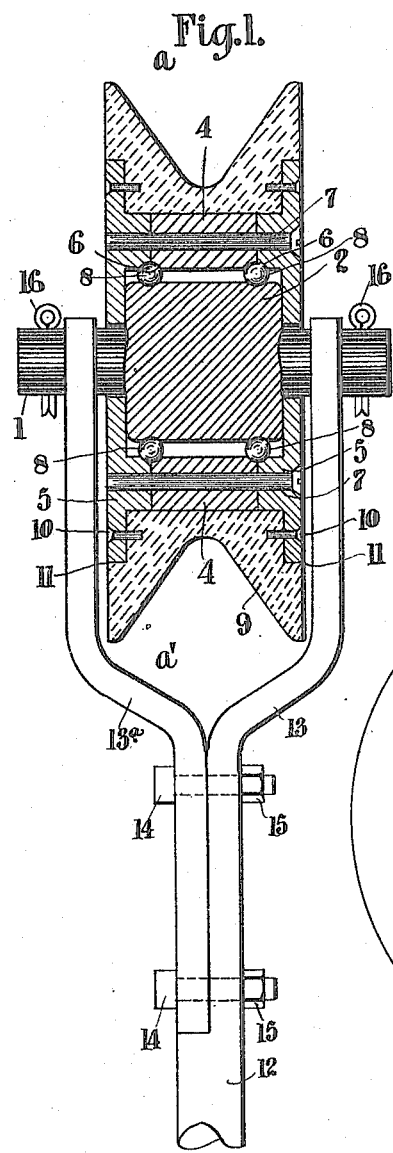
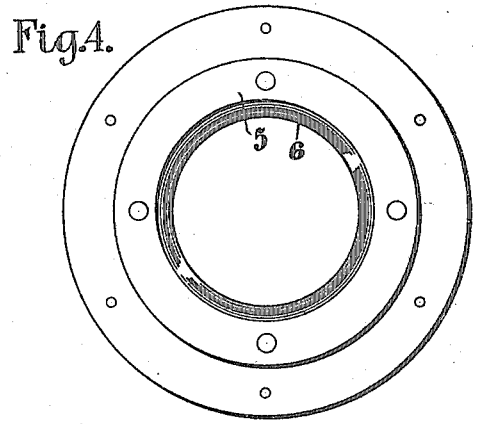
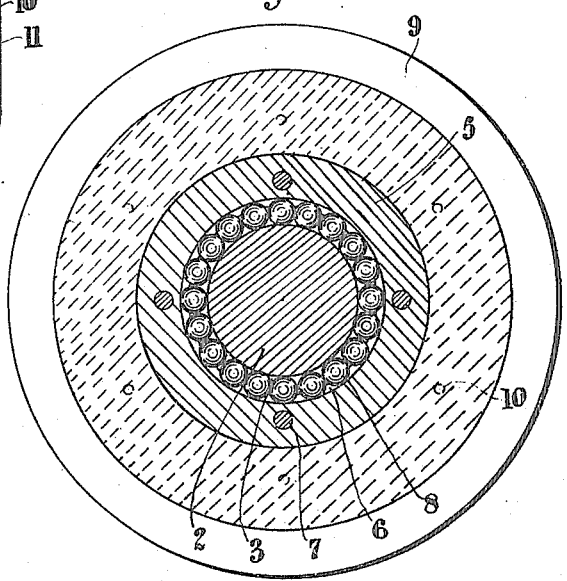
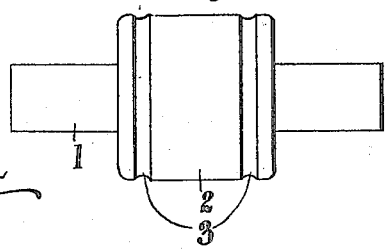
Witnesses
Inventor.
H.C. ADAM

UNITED STATES PATENT OFFICE.

HENRY CARL ADAM, OF HAMILTON, ONTARIO, CANADA, ASSIGNOR OF ONE-HALF TO JACOB CHRISTIF ADAM, OF VANCOUVER, BRITISH COLUMBIA, CANADA.

ANTIFRICTION-BEARING FOR TROLLEY-WHEELS.

1,136,200.  Specification of Letters Patent.  Patented Apr. 20, 1915.

Application filed January 2, 1914. Serial No. 810,027.

*To all whom it may concern:*

Be it known that I, HENRY CARL ADAM, of the city of Hamilton, in the county of Wentworth, in the Province of Ontario, Canada, have invented certain new and useful Improvements in Antifriction-Bearings for Trolley-Wheels, of which the following is the specification.

My invention relates to improvements in trolley wheels, and the object of the invention is to devise a simple and effective wheel which will be self lubricating and which will not throw oil over the top of the car as so frequently occurs in the forms of self oiling trolley wheels at present in use.

A further object is to construct a trolley wheel in which any of the parts can be readily renewed; and a still further object is to devise a trolley wheel which can be readily taken apart.

My invention consists of a spindle or axle having a central cylindrical shaped boss and peripheral ball races on the boss, an annular portion surrounding the boss having removable flanged sides and ball races in the interior thereof adapted to register with the ball races on the boss of the axle, balls inserted in between the ball races, a grooved portion extending around the annular portion and suitably secured to the flanges thereof, all as hereinafter more particularly described and illustrated in the accompanying drawing, in which:—

Figure 1 represents a vertical cross section of a wheel constructed according to my invention showing the same mounted on the harp of a trolley pole. Fig. 2 is a vertical section of the wheel taken through the line *a—a'* (Fig. 1). Fig. 3 is an elevation of one of the flanges of the annular portion viewed from the inside of the flange. Fig. 4 is an elevational detail of the axle and boss.

Like characters of reference indicate corresponding parts in the different views.

1 is the axle and 2 is the cylindrical boss formed thereon having the peripheral ball races 3.

4 is an annular portion surrounding the boss provided with the removable flanges 5.

6, 6 are ball races in the interior of the annular portion adapted to register with the ball races 3.

7, 7 are screw bolts securing the removable flanges 5 to the annular portion 4.

8, 8 are balls interposed between the ball races 3 and 6.

9 is a grooved portion surrounding the annular portion and secured to the flanges 5 thereof by the screws 10. The sides of the grooved portions 9 are cut away at 11 so that the flanges 5 will lie flush with the sides of the grooved portion when the latter is attached thereto.

12 is a trolley pole and 13 is one portion of the harp.

13ª is the other portion of the harp which is detachably connected to the other portion 13 by the bolts 14 and nuts 15.

16, 16 are cotter pins extending through the axle 1 exteriorly of the portions 13 and 13ª. The grooved portion 9 is adapted to engage the trolley wire, and the harp of the trolley pole in this instance is divided as above described so as to be able to remove the trolley wheel therefrom.

When a wheel is assembled vaseline is inserted between the boss 2 and the annular portion 4 which will lubricate the balls and thus provide a wheel which will turn freely and without friction. Further as there is no oil there will be no splashing over the top of the car; also it will be seen that the wheel can be readily taken apart by simply removing the bolts 7 and the screws 10 and any worn part renewed. The device, being of such simple construction, can be readily manufactured at a very small cost and consequently will be considerably cheaper than those at present on the market.

Many modifications may be made in the invention without departing from the spirit of the same or the scope of the claims and the form shown is to be taken in an illustrative and not in a limiting sense.

What I claim as my invention and desire to secure by Letters Patent is:—

In a trolley wheel the combination with the harp divided into two portions detachably secured together, of an axle rigidly mounted thereon, said axle provided with a cylindrical boss formed integrally therewith and having peripheral ball races thereon, an annular portion surrounding the boss, flange portions having inwardly extending annular portions engaging the sides of the aforesaid annular portion, means for securing the flange portions to the annular portion, the annular portion surrounding the boss and the inwardly extending annular portions being provided with ball races therein so situated that half is in the annular portion surrounding the boss and half in the inwardly extending annular portions, said ball races coinciding with the ball races in the boss, balls inserted between the said ball races, an annular grooved trolley engaging portion extending around said annular portion, the sides of the said grooved portion being chamfered, the flanges of the flange portions inserted into the chamfers in the grooved portion, and means for securing the flange portions in the said grooved portion.

In testimony whereof, I have signed at the city of Hamilton, in the county of Wentworth, in the Province of Ontario, Canada, this 4th day of December 1913.

HENRY CARL ADAM.

Witnesses:
F. O. M. FETHERSTONHAUGH,
E. M. NEAME.

Copies of this patent may be obtained for five cents each, by addressing the "Commissioner of Patents, Washington, D. C."